(12) United States Patent
Haberl

(10) Patent No.: US 10,245,929 B2
(45) Date of Patent: Apr. 2, 2019

(54) LOCKING DEVICE HAVING A LOCKING HOOK AND A MOVABLE SLIDE

(71) Applicant: Webasto SE, Stockdorf (DE)

(72) Inventor: Franz Haberl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 21 days.

(21) Appl. No.: 15/639,594

(22) Filed: Jun. 30, 2017

(65) Prior Publication Data

US 2018/0015814 A1    Jan. 18, 2018

(30) Foreign Application Priority Data

Jul. 14, 2016    (DE) .................. 10 2016 112 966

(51) Int. Cl.
*B60J 7/08* (2006.01)
*B60J 7/185* (2006.01)

(52) U.S. Cl.
CPC .................. *B60J 7/1851* (2013.01)

(58) Field of Classification Search
CPC ..................................................... B60J 7/1851
See application file for complete search history.

(56) References Cited

U.S. PATENT DOCUMENTS

| | | | |
|---|---|---|---|
| 2003/0146643 A1* | 8/2003 | Dietl ...................... | B60J 7/1851 296/121 |
| 2004/0169394 A1 | 9/2004 | Obendiek et al. | |
| 2005/0140165 A1* | 6/2005 | Heller ..................... | B60J 7/19 296/121 |
| 2012/0086232 A1* | 4/2012 | Wilke .................... | B60J 7/1851 296/121 |
| 2012/0161465 A1 | 6/2012 | Katrini et al. | |

FOREIGN PATENT DOCUMENTS

| | | |
|---|---|---|
| DE | 10105771 A1 | 9/2002 |
| DE | 10242773 A1 | 3/2004 |
| DE | 102005015165 A1 | 10/2006 |
| DE | 102008008747 A1 | 8/2009 |
| DE | 102010044702 A1 | 3/2012 |
| DE | 102010056246 A1 | 6/2012 |
| DE | 102011113891 A1 | 3/2013 |
| WO | WO-2008151590 A1 * 12/2008 ............ B60J 7/1851 |

* cited by examiner

*Primary Examiner* — Lori L Lyjak

(74) *Attorney, Agent, or Firm* — Fitch, Even, Tabin & Flannery, LLP

(57) ABSTRACT

A locking device for a top of a convertible vehicle having a locking support, a locking hook, which can be shifted in a translational and/or rotational manner so as to be displaced between a release position and a locked position, and a driving mechanism for the locking hook, the driving mechanism having a driving wheel, which is driven by a driving motor and which drives a slide movable on the locking support. The slide is connected to a driving section of the locking hook via a pull-link arrangement in such a manner that the locking hook undergoes a pivoting movement when the slide is moved.

10 Claims, 17 Drawing Sheets

LOCKING DEVICE HAVING A LOCKING HOOK AND A MOVABLE SLIDE

CROSS-REFERENCE TO RELATED APPLICATIONS

This application claims priority from German Application No. 10 2016 112 966.6, filed Jul. 14, 2016, which is hereby incorporated herein by reference in its entirety for all purposes.

FIELD

The invention relates to a locking device of a top of a convertible vehicle and to a top of a convertible vehicle having a locking device of this kind.

BACKGROUND

A locking device of the kind mentioned above is known from document DE 10 2010 044 702 A1 and serves for fixing a rigid roof element, which can be a front bow of a folding top or a rigid roof segment of a retractable hard top (RHT), to the front cowl of the vehicle in question. The locking device comprises a locking support, which serves as a casing and which can be connected to the rigid roof element. A locking hook is pivotable around a bearing journal movable in the locking support. The locking hook has a hook section that can be displaced between a lowered release position and a raised locked position, in which the hook section is engaged with a corresponding locking element formed at the front cowl. For displacing the locking hook, the locking device has a driving mechanism, by means of which the bearing journal can be moved in such a manner that a displacing movement is introduced into the locking hook. Via a link arrangement of the driving mechanism, the driving torque generated by a driving motor is transmitted to a crosshead, on which the bearing journal of the locking hook is mounted and which is movable in corresponding guiding tracks of the locking support. In this locking device, the position of the locking hook with respect to the locking support is not always unambiguously defined. In fact, the locking hook is movable in the transverse direction because it can be turned about a crosshead axis that extends in the vertical direction. Additionally, a magnet is used to retain the locking hook, said magnet pulling the locking hook against a sliding surface. Also, the driving mechanism has an elaborate design because the crosshead is connected to a driving link arrangement both at the top and at the bottom. This is disadvantageous in terms of height and weight and is also reflected in the production costs of the locking device. Furthermore, merely a pulling force extending between the bearing journal and the hook section can be generated in this locking device. A force component perpendicular to said direction cannot be generated.

SUMMARY

The object of the invention is to provide a locking device of the kind mentioned above that has an optimized driving mechanism.

According to the invention, this object is attained by the locking device having a locking support, a locking hook, which can be shifted in a translational and rotational manner; or in a translational manner; or in a rotational manner so as to be displaced between a release position and a locked position, and a driving mechanism for the locking hook, the driving mechanism having a driving wheel, which is driven by a driving motor and which drives a slide movable on the locking support, wherein the slide is connected to a driving section of the locking hook via a pull-link arrangement in such a manner that the locking hook undergoes a pivoting movement when the slide is moved.

Therefore, according to the invention, it is proposed that the slide be connected to a driving end of the locking hook via a pull-link arrangement. The pull-link arrangement is thus arranged between the locking hook and the slide, allowing a torque to be introduced into the locking hook, said torque pushing the hook end upward during displacement from a release position into a closed position. The pull-link arrangement can also retain the locking hook in the transverse direction, the hook thus having no freedom of movement in the transverse direction of the vehicle. The slide, which is advantageously guided in a guiding rail of the locking support, has only one degree of freedom, which corresponds to the movement in the guiding rail.

In a preferred embodiment of the locking device according to the invention, the locking hook is mounted on the slide via a journal. In this way, a multi joint arrangement guiding the displacing movement of the locking hook is realized by means of the slide, the pull-link arrangement and the locking hook.

The journal via which the locking hook is mounted on the slide can engage into an oblong hole. The oblong hole is advantageously formed on the locking hook. Of course, it is also contemplated for the journal to be fixed to the locking hook and for the oblong hole to be formed on the slide. The pivot axis of the locking hook travels in the oblong hole during displacement of the locking hook.

Alternatively, instead of the oblong-hole/journal connection, an additional link could be provided between the slide and the locking hook.

In an embodiment of the locking device according to the invention that is simple to implement in terms of construction, the pull-link arrangement is composed of one link or of a pair of links which is/are mounted on the locking hook via a first hinge point and on the slide via a second hinge point. The pull-link arrangement thus consists of a single intermediate lever or of a pair of intermediate levers which is/are arranged between the locking hook and the slide.

In order to ensure that the locking hook always takes up a defined position with respect to the locking support, the locking support can have a guiding track for a guiding element which is arranged on the pull-link arrangement. The guiding element could also be arranged on the locking hook itself. When the slide is moved in the locking support, the guiding element arranged on the pull-link arrangement will thus be moved in the guiding track of the locking support, the hook end of the locking hook thus being pulled upward from the release position into the locked position in a defined manner when the locking hook is being displaced. In a corresponding manner, the hook end of the locking hook will be pushed downward from the locked position into the release position when the locking hook is being displaced.

In order to also be able to retain the locking hook in the locking support in particular without rattling, the locking hook is preferably pre-loaded in the direction of its locked position by means of a retaining spring.

In a special embodiment of the locking device according to the invention, the retaining spring acts on the end of the pull-link arrangement that is associated with the locking hook.

The driving wheel, which drives the slide, can be connected to the slide in particular via a driving link arrangement. The driving link arrangement can be formed in the manner of a crank drive in conjunction with the driving wheel and can comprise a coupling link which is hinged to the drive wheel at one side and to the slide at the other side. The driving wheel being driven rotationally causes a translational shift of the slide in or on the locking support.

The driving wheel can have a stop which interacts with end stops of the locking support. The end stops define the release position and the locked position of the locking hook.

The invention also relates to a top of a convertible vehicle comprising a locking device of the kind mentioned above, by means of which the top or a top element can be fixed to a front cowl of the vehicle. A locking counterpart is arranged on the front cowl, said locking counterpart interacting with the hook end or gripping end of the locking hook to fix the top or the top element. The locking counterpart is a bolt, for example, behind which the locking hook can engage.

Other advantages and advantageous embodiments of the subject-matter of the invention are apparent from the description, the drawing and the claims.

BRIEF DESCRIPTIONS OF THE DRAWINGS

An embodiment of a top having a locking device according to the invention is illustrated in the drawing in a schematically simplified manner and is explained in more detail in the following description.

DETAILED DESCRIPTION

Figure 1:
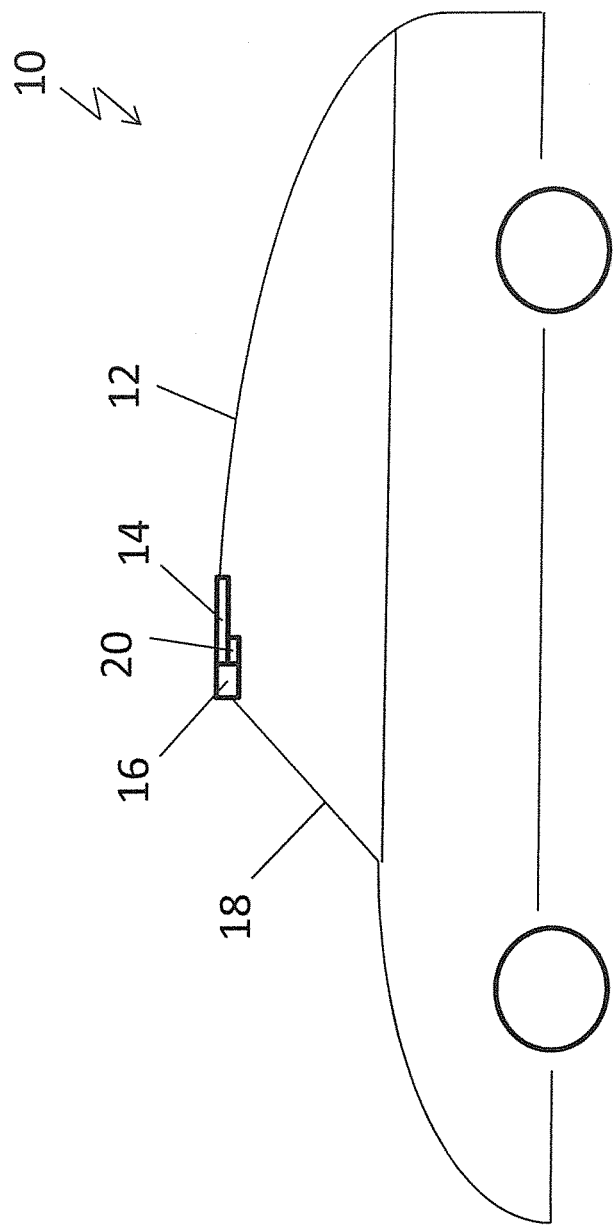
FIG. 1 shows a schematic side view of a convertible vehicle having a top which is fixed to a front cowl by means of a locking device.
Figure 2:
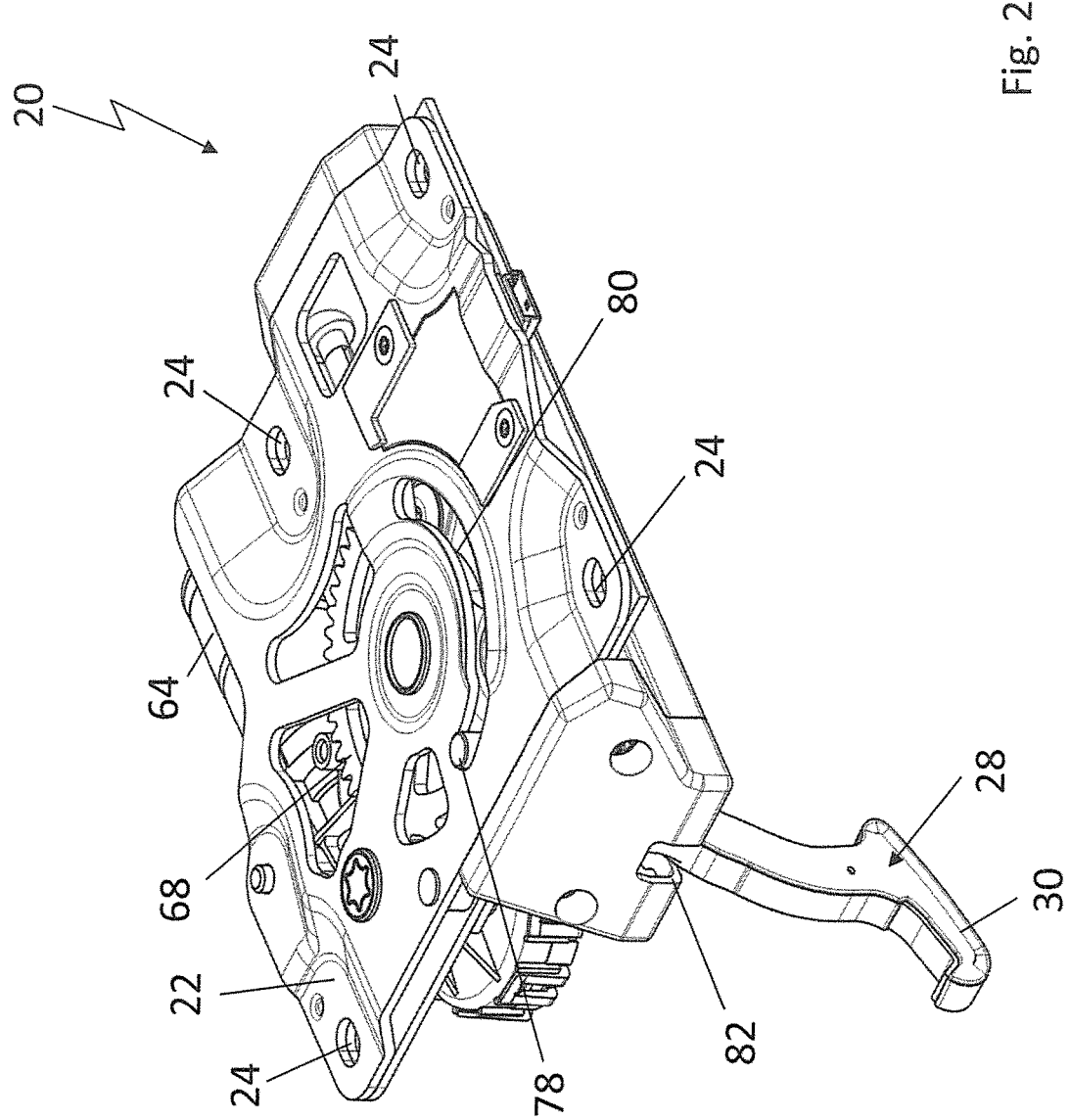
FIG. 2 shows a perspective top view of the locking device when in its release position.
Figure 3:
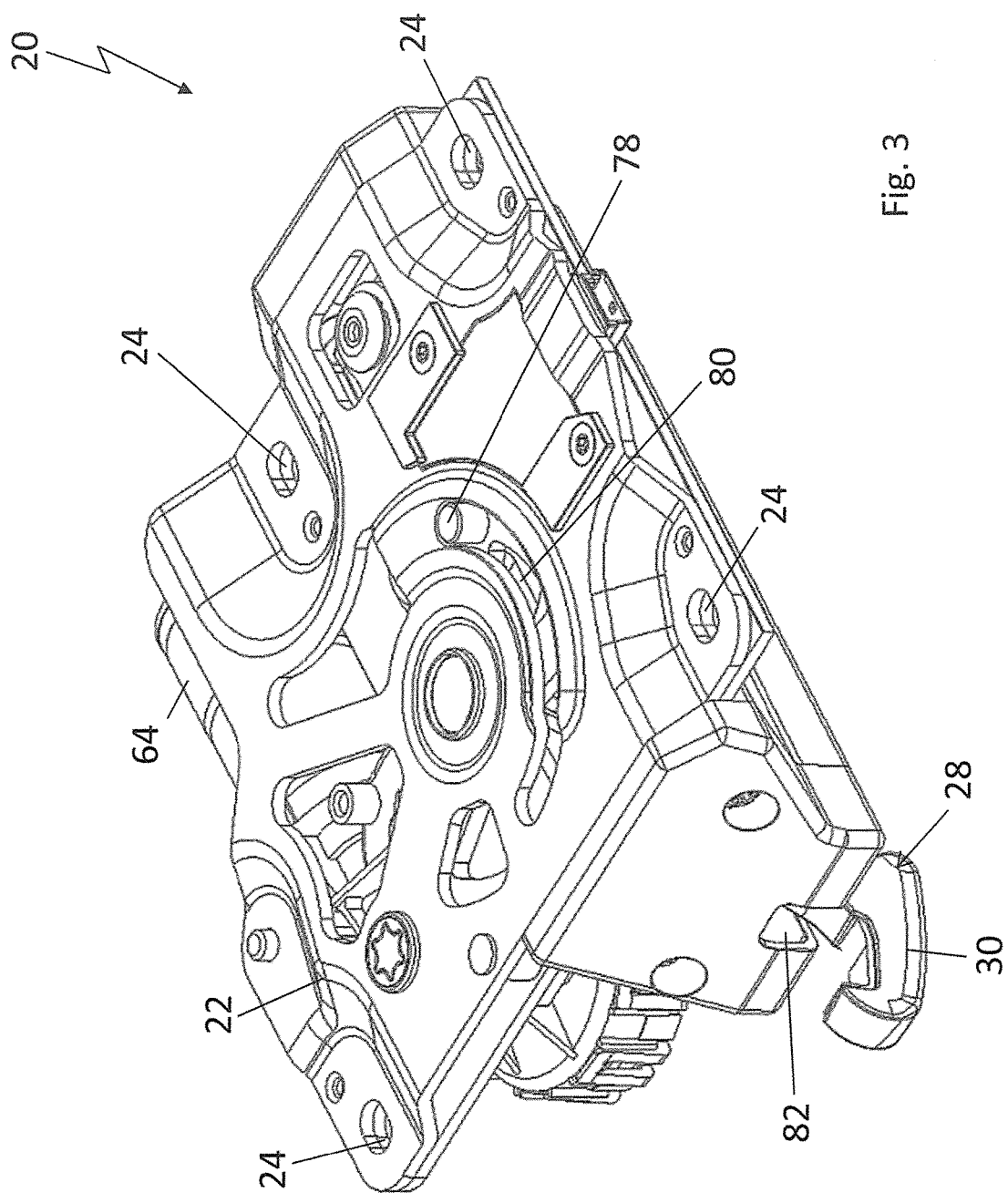
FIG. 3 shows a perspective top view of the locking device when in its locked position.
Figure 4:
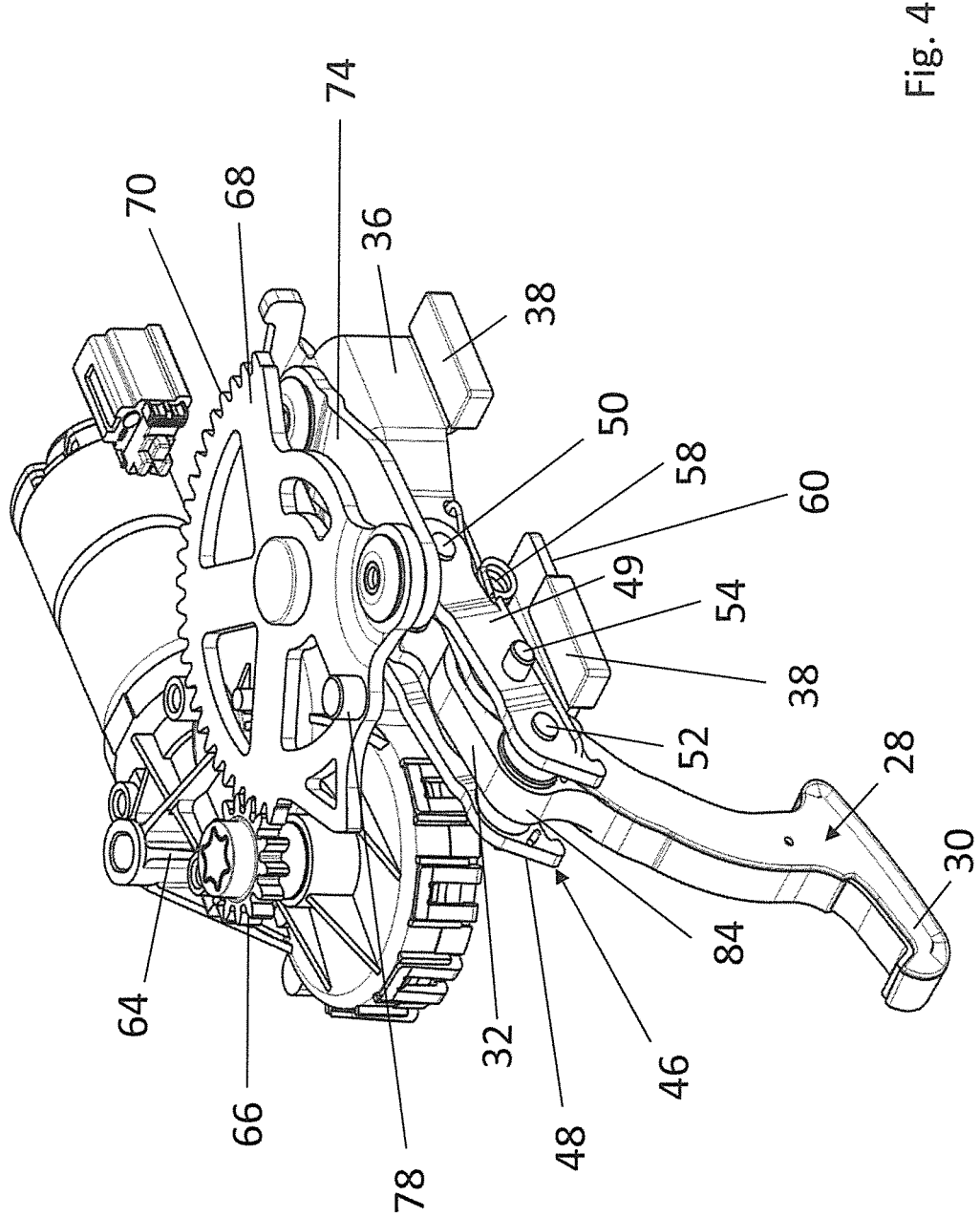
FIG. 4 shows an illustration of the locking device when in its release position corresponding to FIG. 2, but shown without a locking support.
Figure 5:
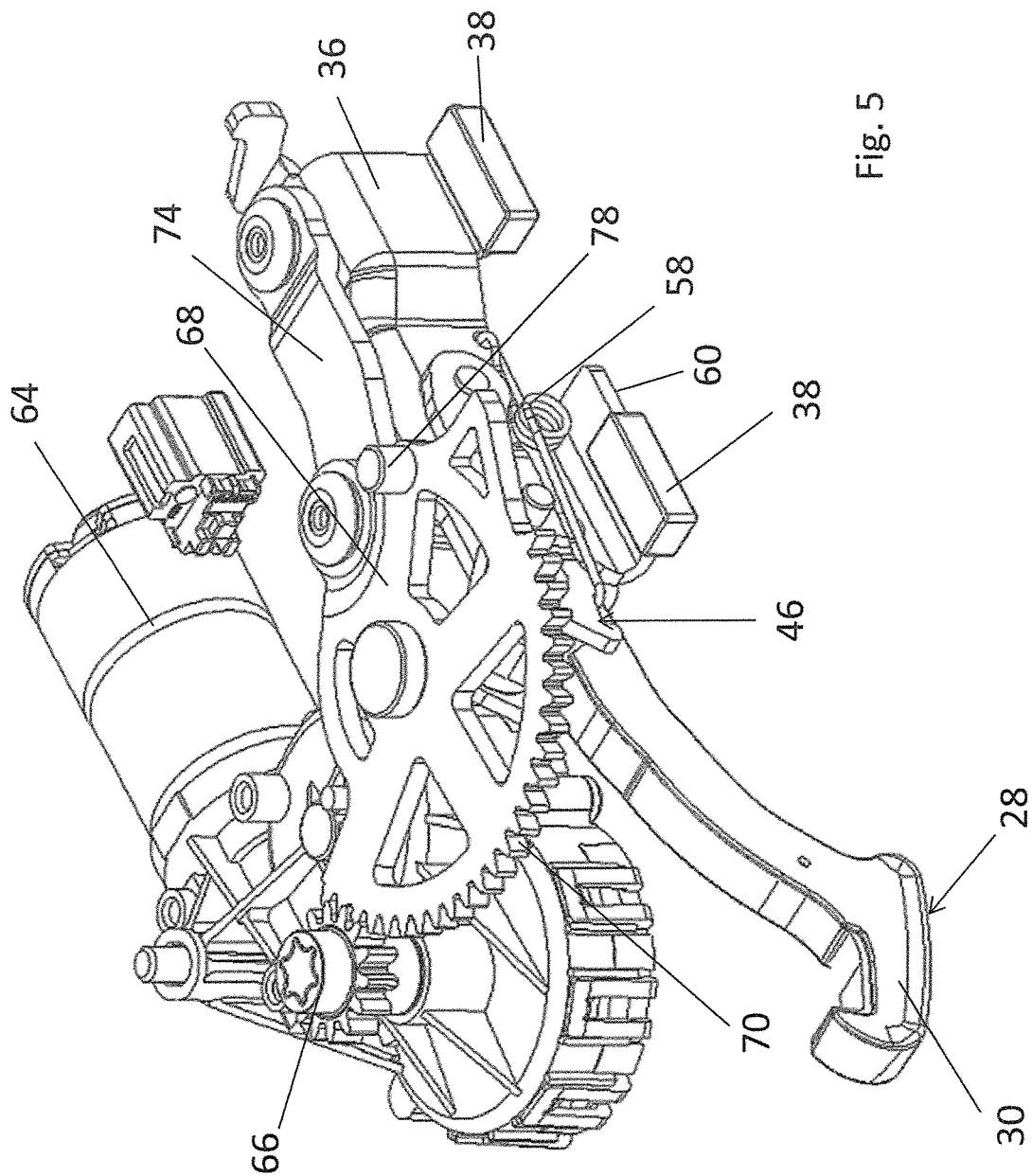
FIG. 5 shows an illustration of the locking device corresponding to FIG. 3, but in its locked position and shown without the locking support.
Figure 6:
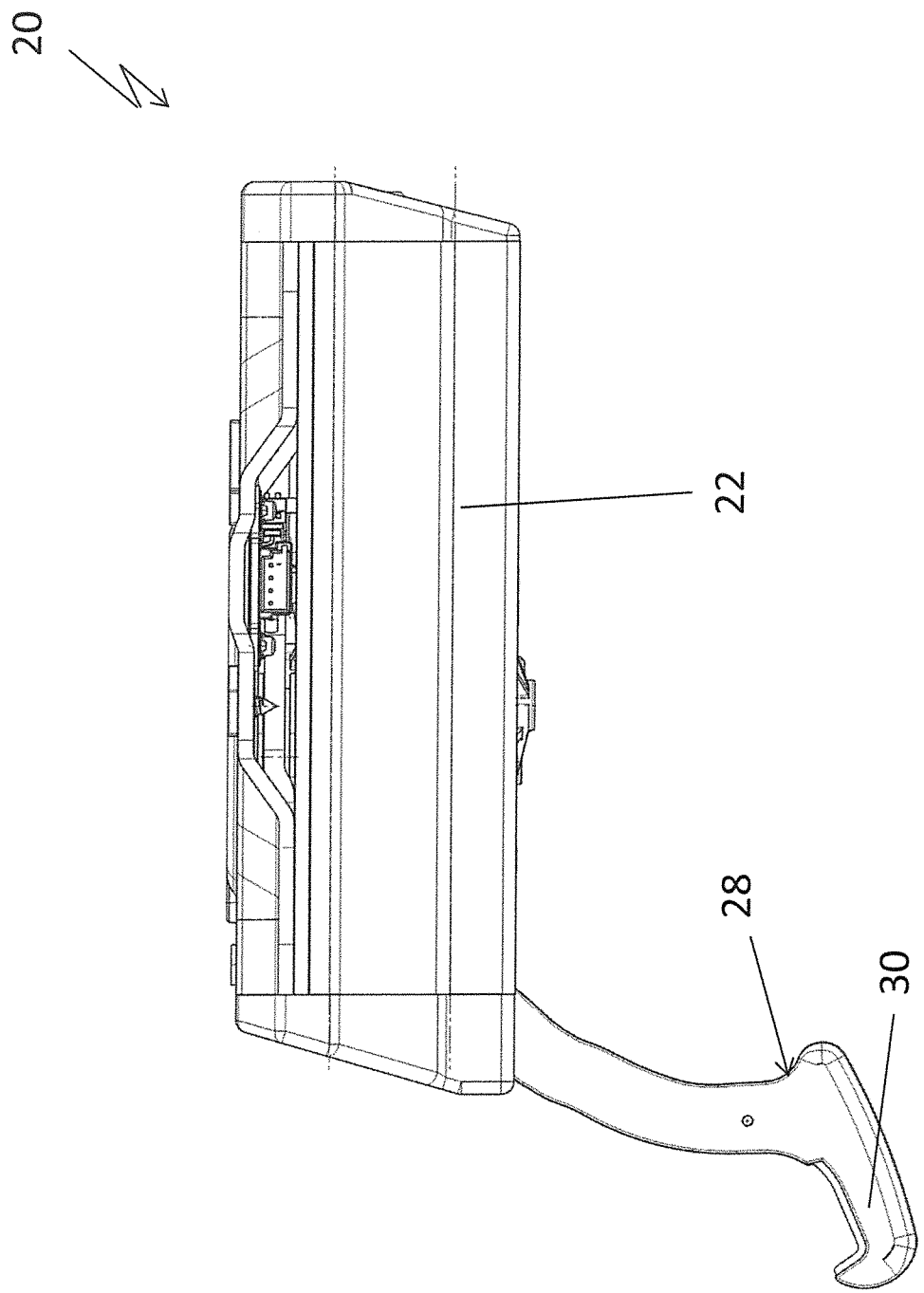
FIG. 6 shows a side view of the locking device when in its release position.

In FIG. 1, a convertible vehicle 10 is illustrated, which has a folding top 12, which can be displaced between a closed position, in which the vehicle interior is covered, and a storage position, in which the vehicle interior is open toward the top. In the closed position illustrated in FIG. 1, a front bow 14 of the folding top 12 is fixed to a front cowl 16 of the vehicle 10, said front cowl 16 being an upper frame part of a frame of a windshield 18, said frame part extending in the transverse direction of the vehicle 10.

The closed position of the folding top 12 is secured by means of a locking device 20, which is arranged at the underside of the front bow 14 and which is illustrated on its own in FIGS. 2 to 17. In the secured position, the locking device 20 takes up its locked position, whereas the locking device 20 is brought or shifted into its release position in order to displace the folding top 12.

The locking device 20 comprises a locking support 22, which has screw holes 24 for being fixed to the front bow and to which the other components of the locking device 20 are mounted or attached and which accommodates them at least in part. The locking support 22, which has a lid and a bottom, thus forms a casing of the locking device 20.

Figure 7:
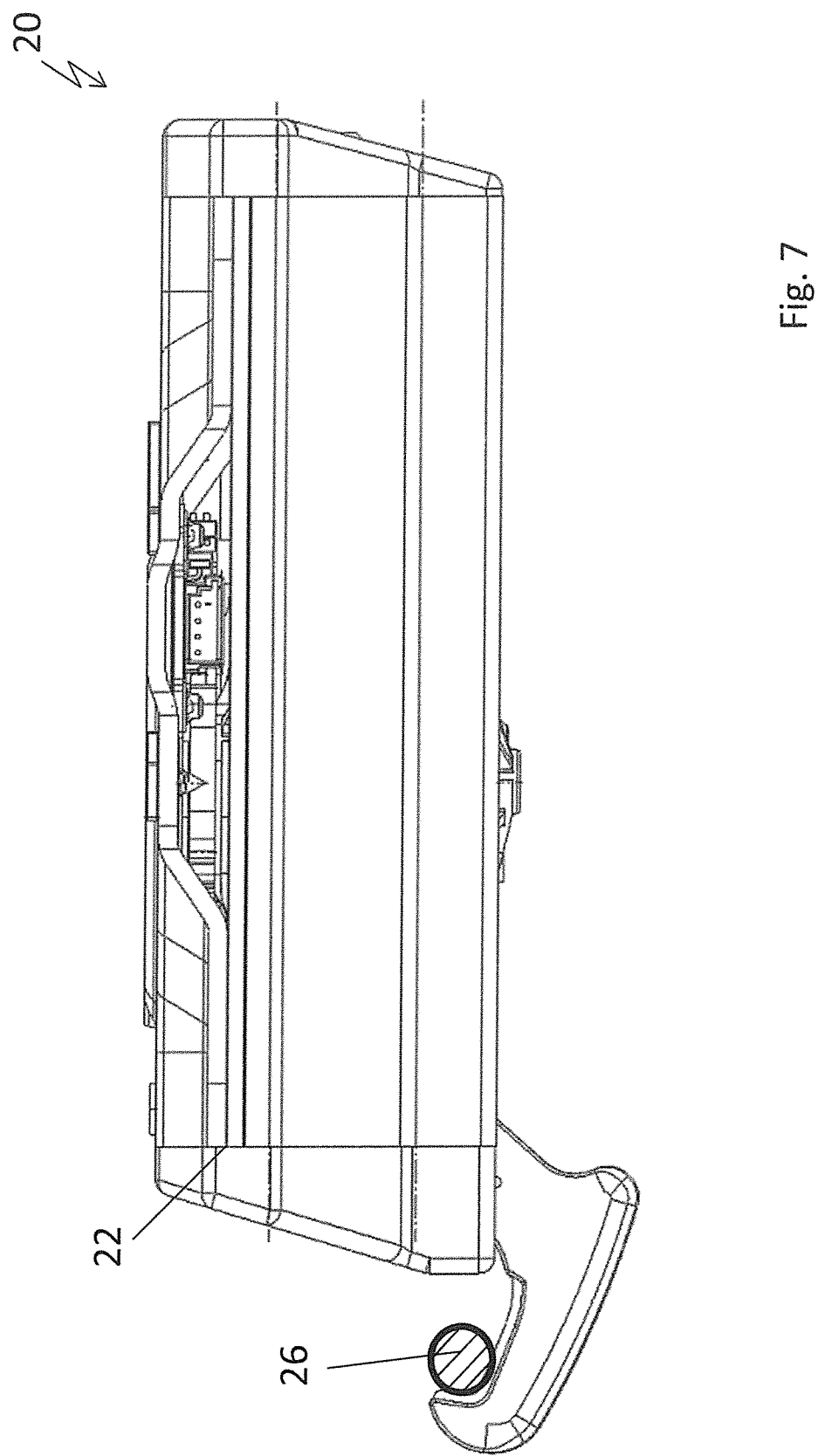
FIG. 7 shows a side view of the locking device when in its locked position corresponding to FIG. 6.
Figure 8:
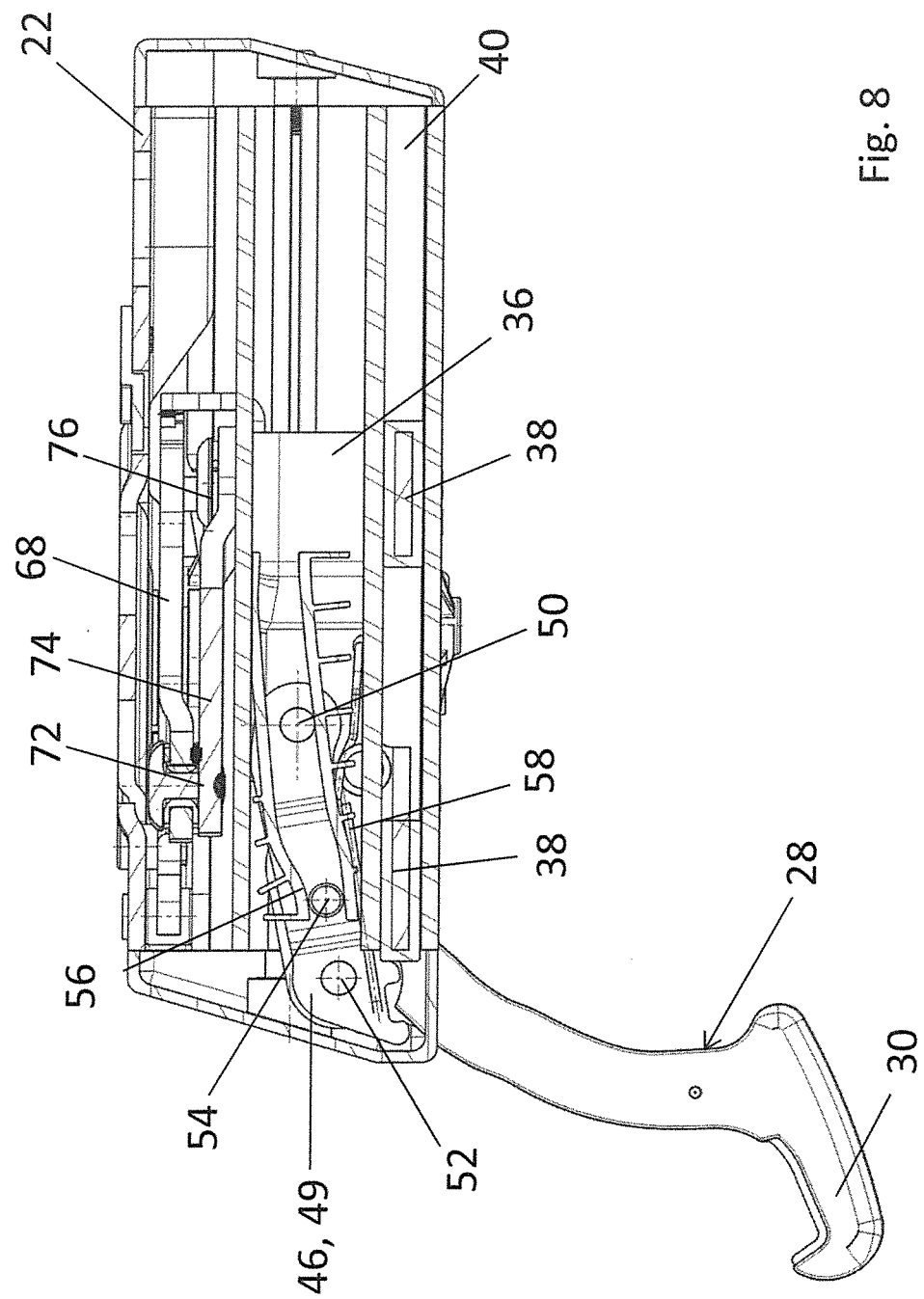
FIG. 8 shows a longitudinal cross-section of the locking device along line VIII-VIII in FIG. 14 when in its release position.
Figure 9:
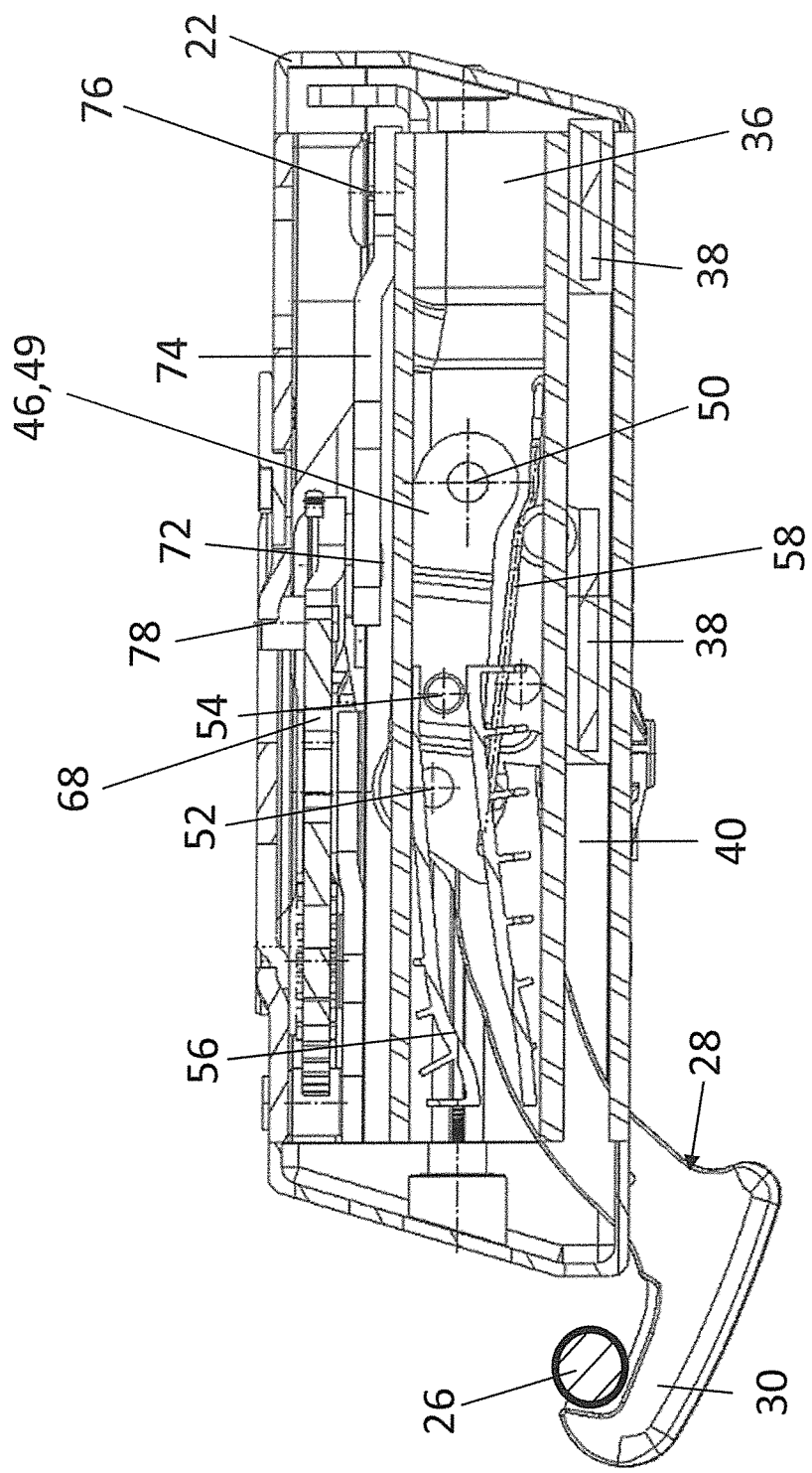
FIG. 9 shows a longitudinal cross-section corresponding to FIG. 8 through the locking device along line IX-IX in FIG. 15, but in its locked position.
Figure 10:
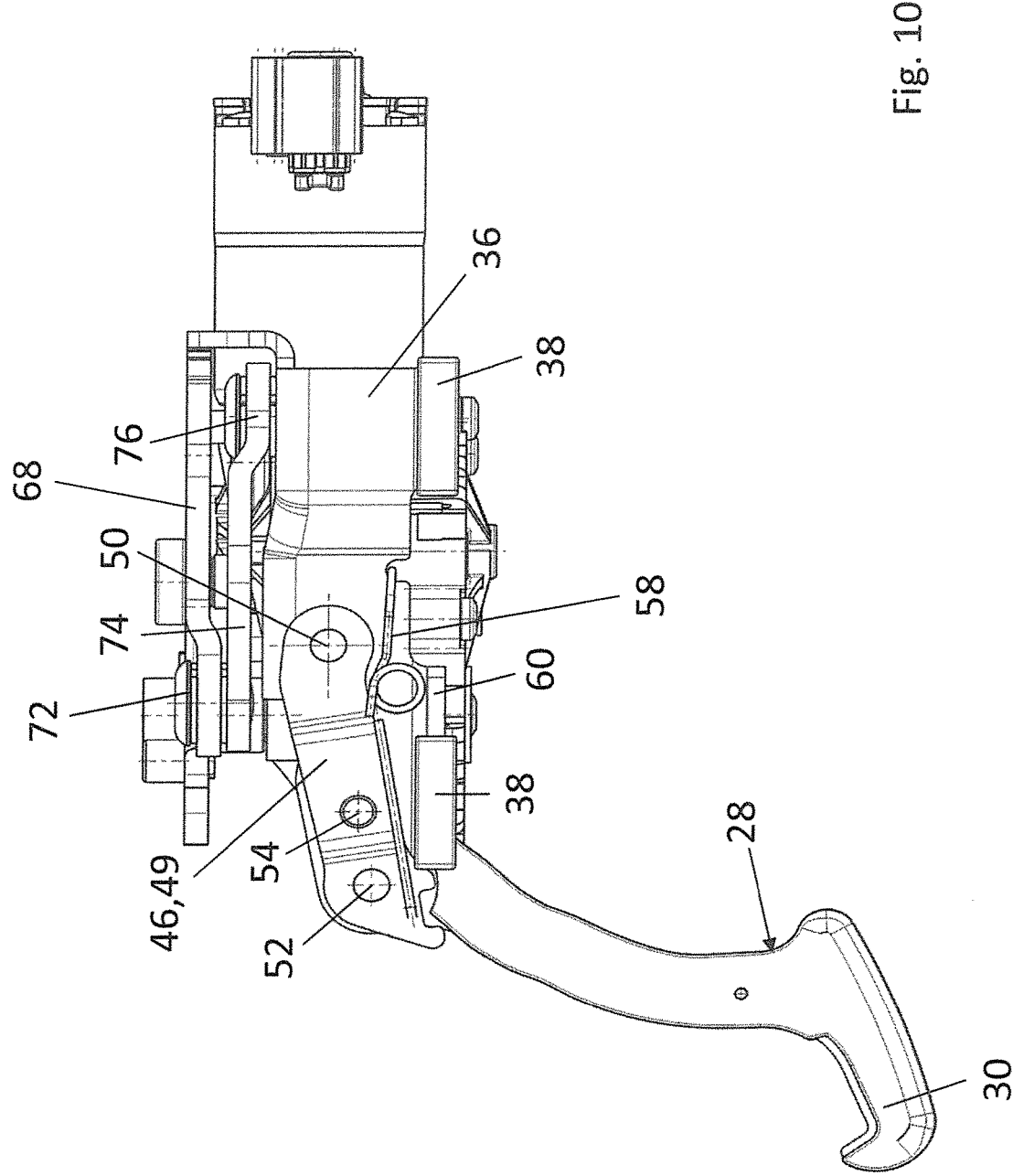
FIG. 10 shows a side view of the locking device when in its release position, but shown without the locking support.
Figure 11:
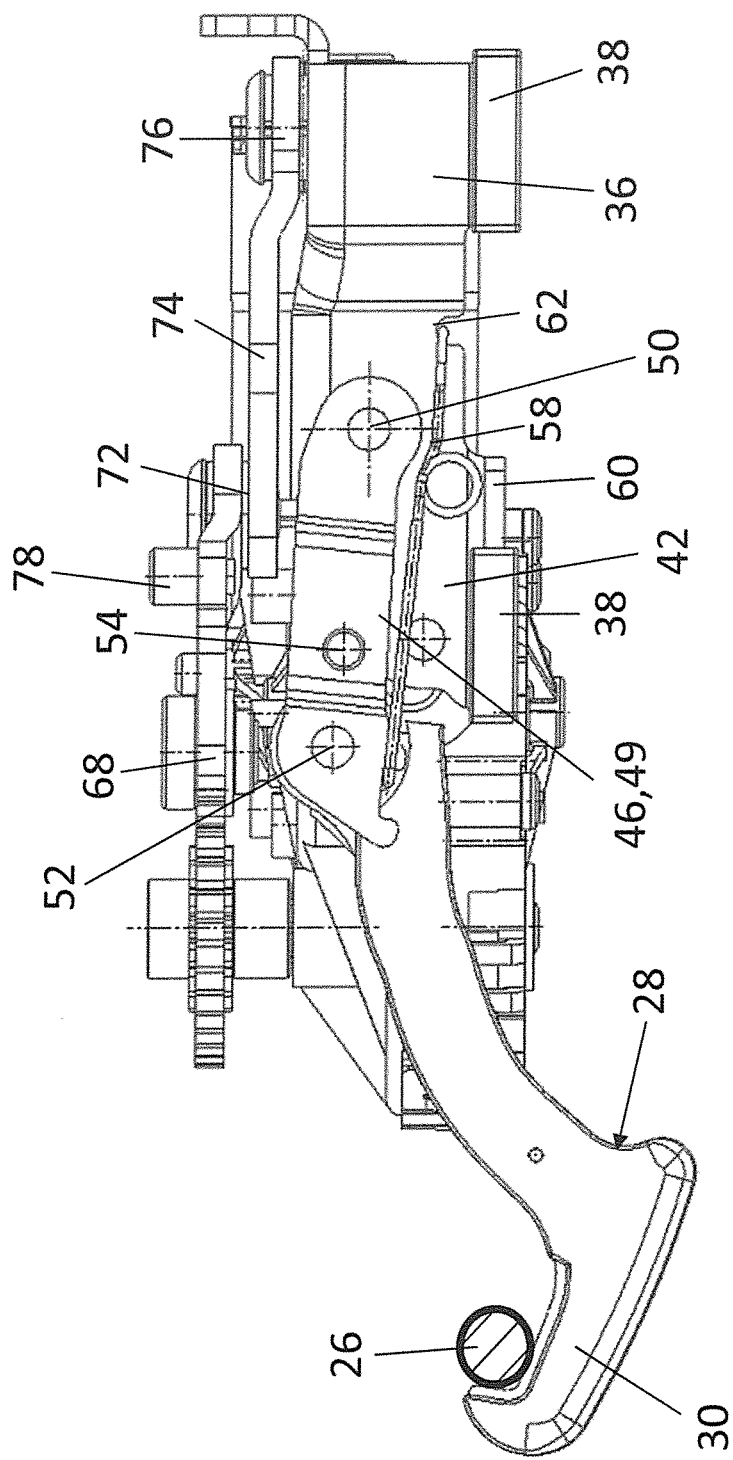
FIG. 11 shows a side view of the locking device corresponding to FIG. 10, but in its locked position.
Figure 12:
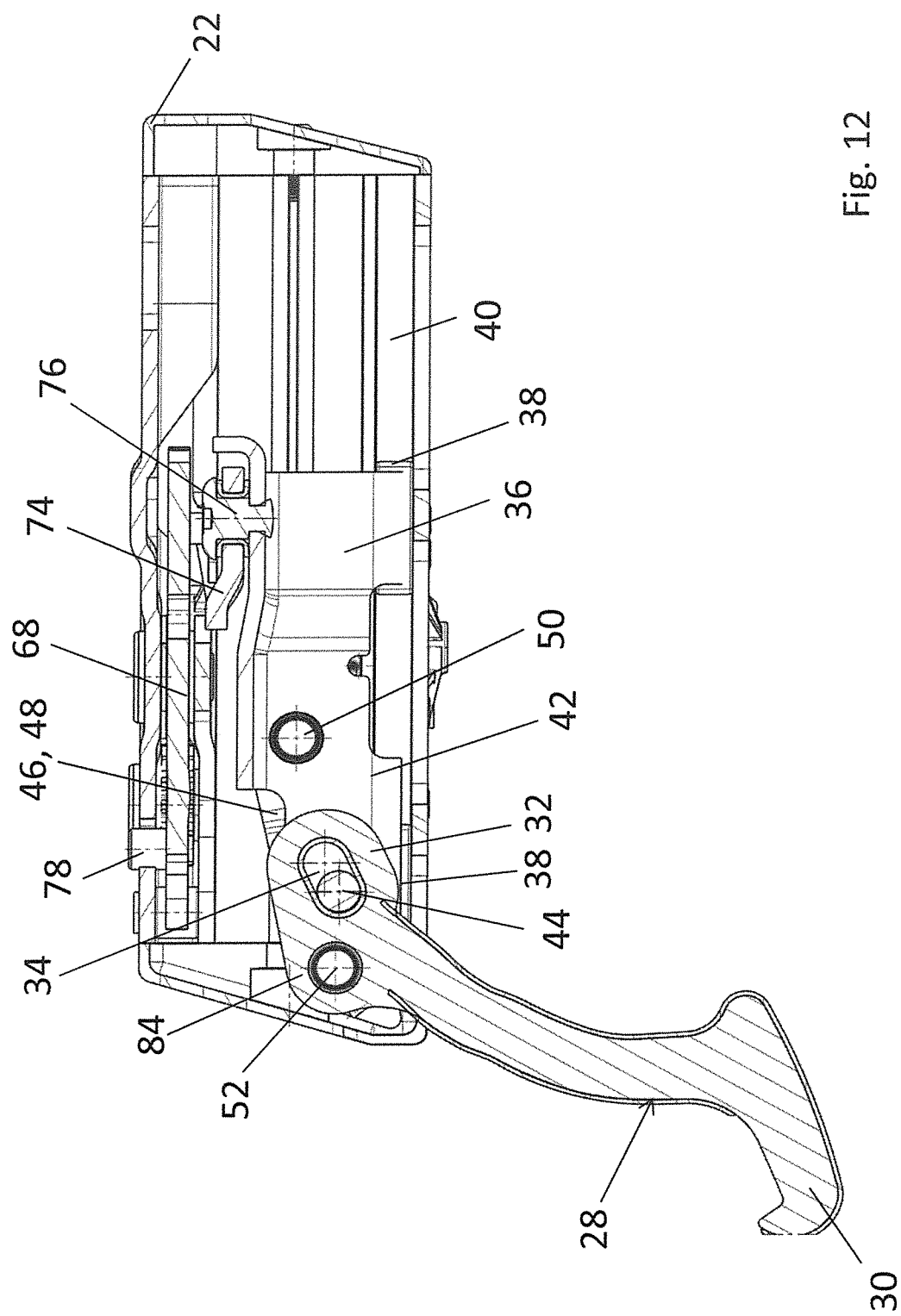
FIG. 12 shows another longitudinal cross-section through the locking device along line XII-XII in FIG. 14 when in its release position.
Figure 13:
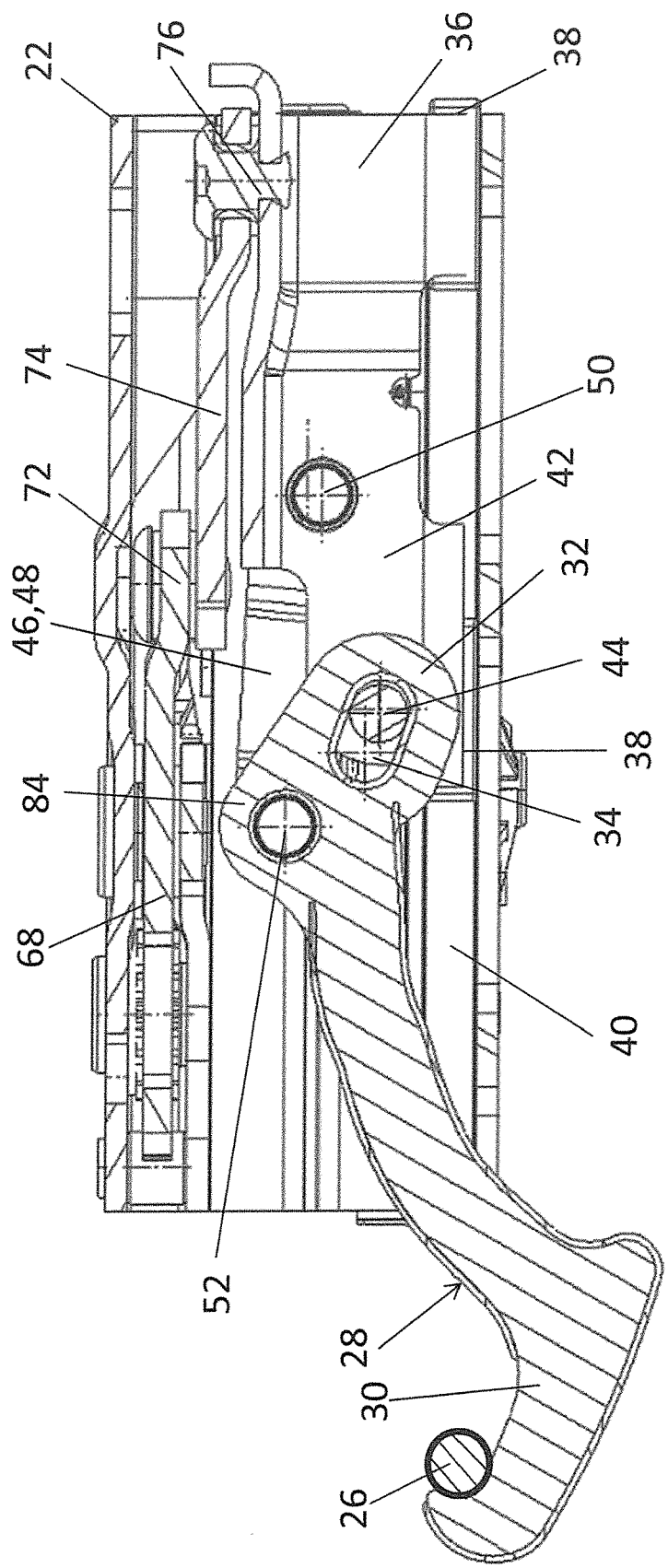
FIG. 13 shows a longitudinal cross-section corresponding to FIG. 12 along line XIII-XIII in FIG. 15 when in its locked position.

The locking device 20 comprises a locking hook 28 to become engaged with a locking bolt 26, which is arranged on the front cowl 16 of the vehicle structure and which is illustrated in FIGS. 7, 9 and 11. The locking hook 28 has a front hook section 30, which engages behind the locking bolt 26 of the front cowl 16 when in the locked position, and a rear bearing section 32, in which an oblong hole 34 is formed (cf. FIGS. 12 and 13).

For being driven, the locking hook 28 is connected to a slide 36, which has two sliding feet 38 on each of its two sides with respect to the vertical longitudinal center plane of the locking hook, said sliding feet 38 being guided in a guiding track 40 of the locking support 22.

The slide 36 has two lateral flanks 42, between which the rear bearing section 32 of the locking hook 28 is arranged and which are connected to each other via a journal 44 that penetrates the oblong hole 34 of the locking hook 28.

Between the slide 36 and the locking hook 28, a pull-link arrangement 46 is arranged, which is composed of two pull links 48 and 49, between which a front end of the slide 36 and the rear bearing section 32 and a driving section 84 of the locking hook 28 are arranged. The pull links 48 and 49 are each hinged to the slide 36 via a rear hinge point 50, which is formed by a bolt penetrating the slide 36. At their front ends, the pull links 48 are hinged to the driving section 84 of the locking hook 28 via a hinge point 52 defined by a journal.

At its outer side, the pull link 49 carries a journal-like guiding element 54, which is guided in a guiding track or slotted track 56, which is arranged on the inner side of the locking support 22. It defines upper and lower moving-curve limits.

In order to pre-load the locking hook 28 in the direction of its locked position, the locking device 20 has a leg spring 58, which rests on a protrusion 60 formed on the slide 36 and one leg of which engages into a groove 62 of the slide 36 and a second leg of which is in contact with the pull link 48 at the front-side end roughly below the hinge points 52 and pushes the pull link 48 upward.

At the underside of the casing-like locking support 22, which is composed of multiple parts, a driving motor 64 is arranged, which drives a driving pinion 66. The driving pinion 66 is engaged with a driving wheel 68, which can rotate about an axis A and which has a toothing 70 across an angle of about 120° to 160°, which is engaged with the toothing of the driving pinion 66. The driving wheel 68 has a connecting eye 72, via which a coupling link 74 is hinged thereto, the end of the coupling link 74 that faces away from the driving wheel 68 being hinged to the upper side of the slide 36 via a joint 76.

On its upper side, the driving wheel 68 carries a stop journal 78, which is guided in a slotted track 80 when the driving wheel rotates about axis A, said slotted track 80 running concentrically with respect to axis A and being formed on the casing, i.e. on the locking support 22. The edges of the slotted track 80 in the circumferential direction each form a counterstop for the stop journal 78, defining the release position of the locking hook 28 (cf. FIG. 14) on the one hand and the closed position of the locking hook 28 (cf. FIG. 15) on the other hand.

The locking device 20 described above is actuated in the manner described below.

Figure 14:
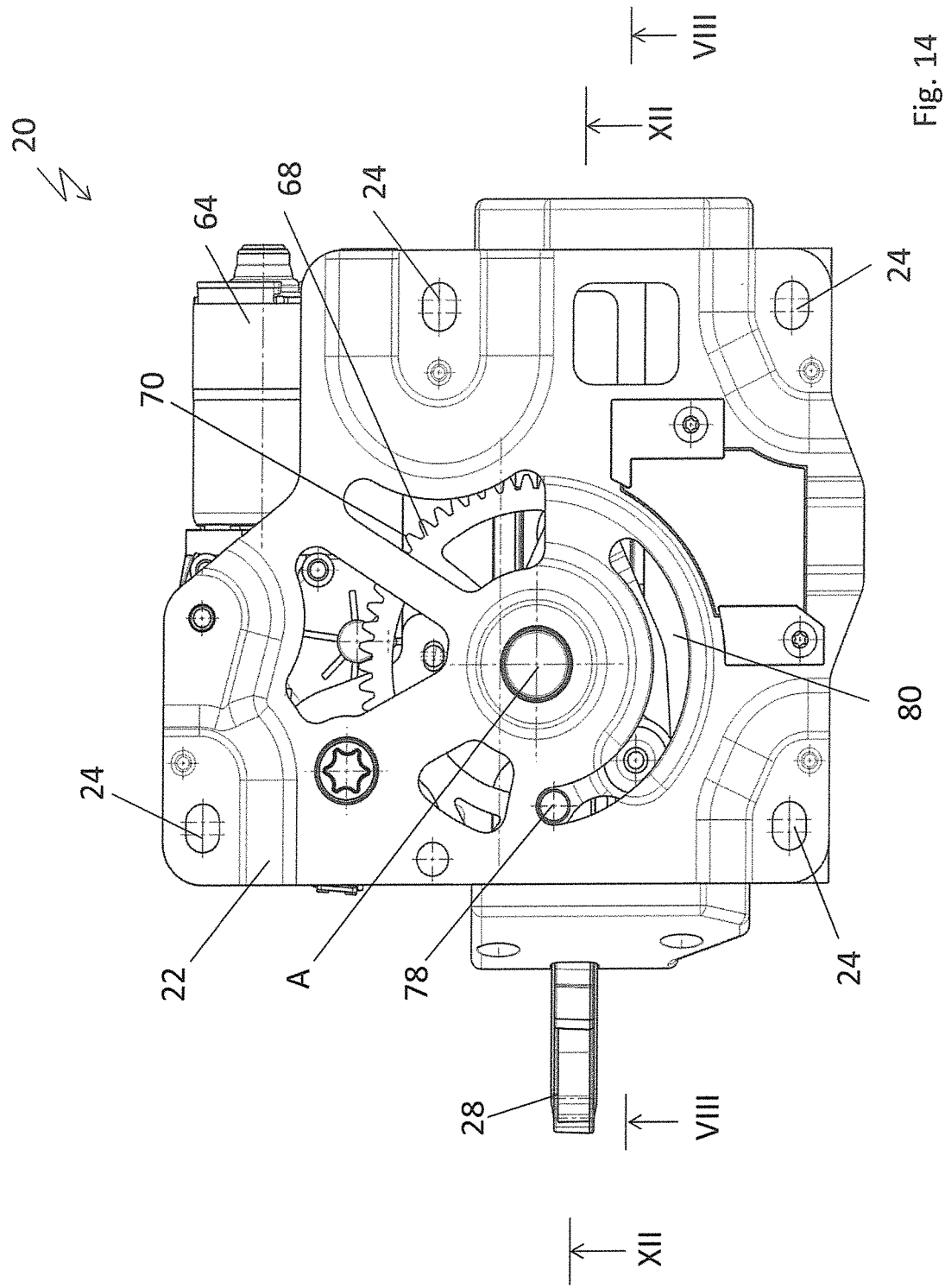
FIG. 14 shows a top view of the locking device when in its release position.
Figure 15:
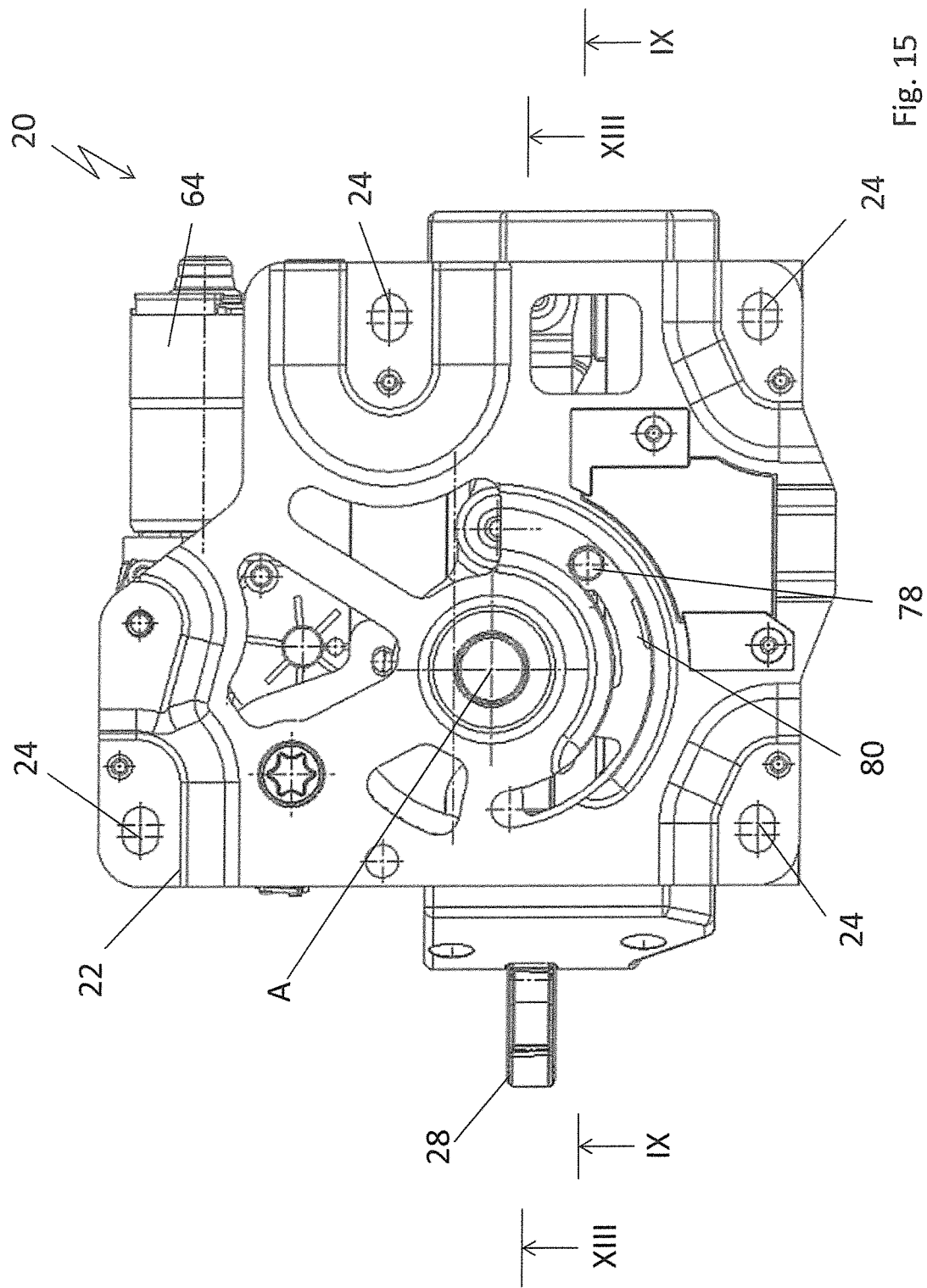
FIG. 15 shows a view corresponding to FIG. 14, but in the locked position of the locking device.
Figure 16:
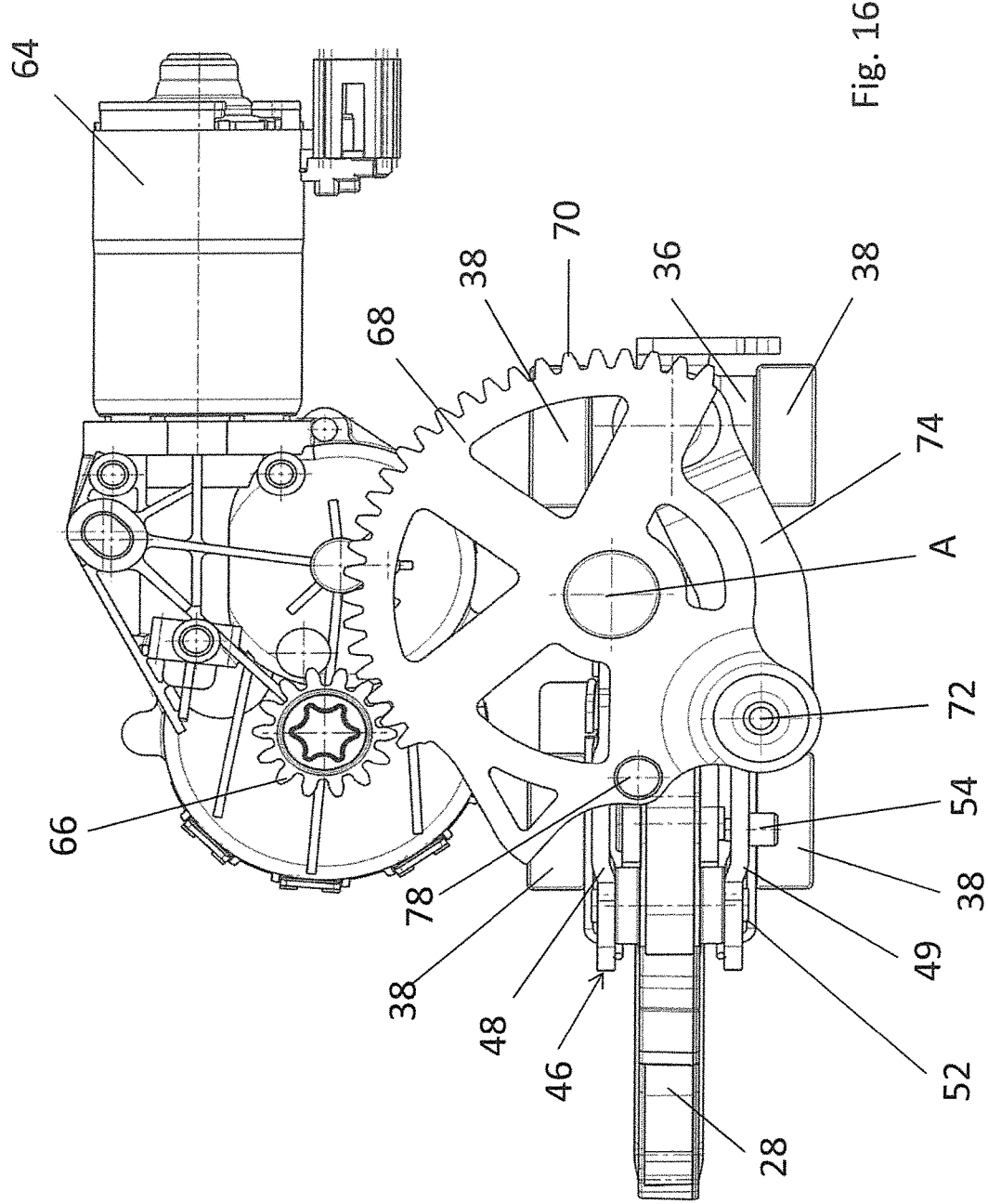
FIG. 16 shows a top view of the locking device when in its release position, shown without the locking support.
Figure 17:
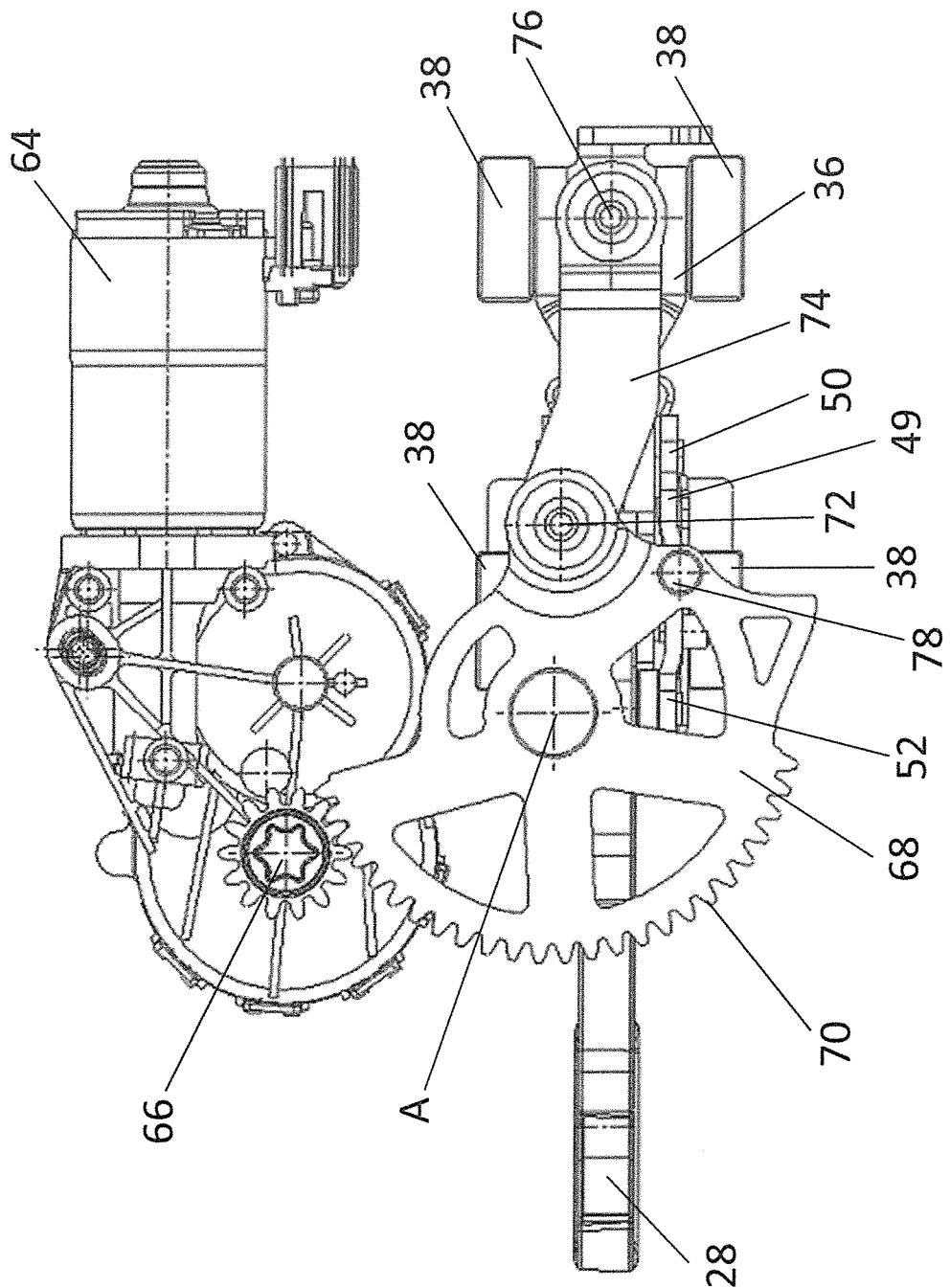
FIG. 17 shows a view of the locking device corresponding to FIG. 16, but in its locked position.

Starting from the release position of the locking device 20 as illustrated in FIG. 14, for example, the driving motor 64 is actuated in such a manner that the driving wheel 68 is rotated counterclockwise about axis A with respect to the orientation illustrated in FIGS. 14 to 17. In this way, the driving wheel 68 exerts thrust on the slide 36 via the coupling link 74, a pulling force thus being exerted on the locking hook 28 via the pull links 48. The locking hook 28 is thus pulled into the locking support 22 through a front-side and bottom-side slot 82, while at the same time being pivoted clockwise with respect to the orientation illustrated in FIGS. 6 to 13, namely about a pivot axis that travels with the journal 44 in the oblong hole. The pivoting movement is caused by the pulling force exerted by the pull links 48 on the driving section 84 of the locking hook 28, in which the hinge point 52 is formed and which is offset from a connecting line between the bearing section 32 and the hook section 30 of the locking hook 28. Additionally, the pivoting movement is controlled by the guiding element 54, which is guided in the guiding track 56.

When adjusting the locking hook, the hook section 30 engages into a recess formed on the front cowl 16, a counterforce thus acting on the front bow 14 upon contact with the locking bolt 26, said counterforce pulling the front bow 14 downward. This is helpful since external forces usually push the front bow 14 to take up a higher position than that of the nominal position. This pushing action can be caused by the tension of a top cover or by a negative pressure occurring when the top is being closed during normal driving.

The invention claimed is:

1. A locking device of a top of a convertible vehicle, comprising a locking support, a locking hook, which can be shifted in at least one of a translational and rotational manner so as to be displaced between a release position and a locked position, and a driving mechanism for the locking hook, said driving mechanism comprising a driving wheel, which is driven by a driving motor and which drives a slide movable on the locking support, wherein the slide is connected to a driving section of the locking hook via a pull-link arrangement in such a manner that the locking hook undergoes a pivoting movement when the slide is moved.

2. The locking device according to claim 1, wherein the locking hook is mounted on the slide via a journal.

3. The locking device according to claim 2, wherein the journal engages into an oblong hole.

4. The locking device according to claim 1, wherein the pull-link arrangement is composed of at least one pull link, which is mounted on the locking hook via a first hinge point and on the slide via a second hinge point.

5. The locking device according to claim 1, wherein the locking support has a guiding track for a guiding element which is arranged on the pull-link arrangement and that the guiding track defines a pivot position of the locking hook with respect to the locking support.

6. The locking device according to claim 1, wherein the locking hook is pre-loaded in a direction of the locking hook's locked position by a retaining spring.

7. The locking device according to claim 6, wherein the retaining spring acts on an end of the pull-link arrangement that is associated with the locking hook.

8. The locking device according to claim 1, wherein the driving wheel is connected to the slide via a coupling-link arrangement.

9. The locking device according to claim 1, wherein the driving wheel has a stop which interacts with end stops of the locking support.

10. A top of a convertible vehicle, comprising a locking device according to claim 1 for fixing a top element to a front cowl of the vehicle.

* * * * *